United States Patent
Weaver et al.

(10) Patent No.: US 10,821,681 B2
(45) Date of Patent: Nov. 3, 2020

(54) LIQUID INFUSION MOLDED CERAMIC MATRIX COMPOSITES AND METHODS OF FORMING THE SAME

(71) Applicant: General Electric Company, Schenectady, NY (US)

(72) Inventors: Jared Hogg Weaver, Clifton Park, NY (US); Nathan Carl Sizemore, Hamilton, OH (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 687 days.

(21) Appl. No.: 15/411,012

(22) Filed: Jan. 20, 2017

(65) Prior Publication Data

US 2018/0207837 A1    Jul. 26, 2018

(51) Int. Cl.

| | |
|---|---|
| *B29C 70/36* | (2006.01) |
| *C04B 35/563* | (2006.01) |
| *C04B 35/628* | (2006.01) |
| *B32B 18/00* | (2006.01) |
| *C04B 35/14* | (2006.01) |
| *C04B 35/638* | (2006.01) |
| *C04B 35/117* | (2006.01) |
| *C04B 35/80* | (2006.01) |
| *C04B 35/565* | (2006.01) |

(52) U.S. Cl.
CPC .............. *B29C 70/36* (2013.01); *B32B 18/00* (2013.01); *C04B 35/117* (2013.01); *C04B 35/14* (2013.01); *C04B 35/563* (2013.01); *C04B 35/565* (2013.01); *C04B 35/62863* (2013.01); *C04B 35/62868* (2013.01); *C04B 35/62871* (2013.01); *C04B 35/62873* (2013.01); *C04B 35/62897* (2013.01); *C04B 35/638* (2013.01); *C04B 35/803* (2013.01); *C04B 35/806* (2013.01); *C04B 2235/524* (2013.01); *C04B 2235/5224* (2013.01); *C04B 2235/5228* (2013.01); *C04B 2235/5232* (2013.01); *C04B 2235/5244* (2013.01); *C04B 2235/5248* (2013.01); *C04B 2235/5252* (2013.01); *C04B 2235/5436* (2013.01); *C04B 2237/341* (2013.01); *C04B 2237/343* (2013.01); *C04B 2237/36* (2013.01); *C04B 2237/365* (2013.01); *C04B 2237/38* (2013.01)

(58) Field of Classification Search
USPC ....................................... 264/257
See application file for complete search history.

(56) References Cited

U.S. PATENT DOCUMENTS

| | | |
|---|---|---|
| 5,204,033 A | 4/1993 | Pearce et al. |
| 5,431,984 A | 7/1995 | Keck et al. |

(Continued)

FOREIGN PATENT DOCUMENTS

WO    WO2015/072929 A1    5/2015

*Primary Examiner* — Jacob T Minskey
(74) *Attorney, Agent, or Firm* — Fletcher Yoder, P.C.

(57) ABSTRACT

Methods for preparing ceramic products using liquid infusion technology and products formed from the same are provided. The methods and products include the incorporation of a particulate material and binder between ceramic fibers such that the fibers may be properly spaced during formation of the ceramic product. Ceramic matrix composite products can thereby be provided using near net shaping methods.

20 Claims, 4 Drawing Sheets

(56) References Cited

U.S. PATENT DOCUMENTS

| | | |
|---|---|---|
| 2010/0189556 A1* | 7/2010 | Propheter-Hinckley .................... F01D 5/284 415/200 |
| 2011/0124483 A1* | 5/2011 | Shah ...................... B82Y 30/00 501/32 |
| 2013/0034740 A1* | 2/2013 | Giachino ................. C08K 7/04 428/457 |
| 2014/0255665 A1 | 9/2014 | Hillier et al. |
| 2016/0159066 A1 | 6/2016 | Landwehr et al. |
| 2016/0214331 A1 | 7/2016 | McCaffrey |
| 2016/0229130 A1 | 8/2016 | Abbott et al. |

\* cited by examiner

LIQUID INFUSION MOLDED CERAMIC MATRIX COMPOSITES AND METHODS OF FORMING THE SAME

FIELD

Embodiments of the present invention generally relate to ceramic matrix composites, particularly ceramic matrix composite products formed by liquid infusion molding.

BACKGROUND

Ceramic matrix composites ("CMCs") have high temperature capability and are light weight. The composites are thus an attractive material for various applications, such as for components in gas turbine engines where temperature durability and weight are important considerations. Current methods of preparing CMC products involve forming a laminate of ceramic fiber and matrix, thermally treating the laminate, and then densifying the laminate. The densified laminate may then be machined to prepare a CMC product with the desired dimensions. Resin transfer molding (RTM) and other near net shape matrix infusion methods that would reduce additional machining and also give better fiber volume fraction control of the product are not favored for manufacturing CMC products. During such near net shape methods, ceramic fibers in the composite tend to bundle together resulting in a defective product. For CMC laminates made from unidirectional plies, there is the additional issue of maintaining the continuity of individual plies when laying the part in the tooling, as there is no cross fiber to support the ply. When laying ceramic fibers and ceramic matrix precursor material in tooling for preparing the CMC product, too much material is often present resulting in compression and movement of the material when the tooling is closed. Too less of material can also be present resulting in a defective product as well.

Thus, an improved design for preparing CMC products is desirable in the art.

BRIEF DESCRIPTION

Aspects and advantages of the invention will be set forth in part in the following description, or may be obvious from the description, or may be learned through practice of the invention.

A method of forming a liquid infusion molded ceramic matrix composite is generally provided, the method comprising preparing a ceramic composite, wherein the ceramic composite comprises ceramic fibers, a binder, and particulate material and wherein at least two of the ceramic fibers are disposed in a parallel direction and wherein preparing a ceramic composite comprises disposing particulate material between the parallel ceramic fibers; placing the ceramic composite in tooling; applying a matrix system to the ceramic composite; treating the matrix system to prepare a set ceramic composite; and removing the set ceramic matrix composite from the tooling. In some embodiments, the particles of the particulate material have an average diameter of about 1 micron to about 20 microns, such as about 3 microns to about 15 microns. In certain embodiments, the particulate material comprises silicon carbide, boron carbide, aluminum oxide, silica, polyamide, polypropylene, or combinations thereof, and in some embodiments, the ceramic fibers comprise silicon carbide, silicon nitride, silicon oxycarbides, silicon oxynitrides, aluminum oxide, silicon dioxide, aluminosilicates, carbon, or combinations thereof.

In certain embodiments of the present disclosure, disposing particulate material between the parallel ceramic fibers comprises depositing at least one particle of the particulate material between the parallel ceramic fibers, wherein the parallel ceramic fibers are disposed in the same ply. In some embodiments, preparing the ceramic composite comprises forming one or more unidirectional plies comprising the ceramic fibers. Still further, in some embodiments, the method comprises removing at least a portion of the binder prior to applying the matrix system to the ceramic composite and removing at least part of the binder, in some embodiments, comprises sublimation, evaporation, volatilization, or combinations thereof.

In some embodiments, the method further comprises thermally treating the set ceramic matrix composite, applying an infiltrant to the set ceramic matrix composite, and densifying the set ceramic matrix composite to form a densified ceramic matrix composite. Applying an infiltrant to the set ceramic matrix composite, and densifying the set ceramic matrix composite to form a densified ceramic matrix composite, in some embodiments, is performed using CVI, MI, PIP, or a combination thereof.

Aspects of the present disclosure are also generally directed to a liquid infusion molded ceramic product comprising a plurality of ceramic fibers; particulate material comprising a plurality of particles, wherein at least one particle of the plurality of particles is disposed between at least two ceramic fibers of the plurality of ceramic fibers wherein the two ceramic fibers are positioned in a parallel direction; and ceramic matrix material disposed between the plurality of ceramic fibers such that the majority of the plurality of ceramic fibers are not touching another ceramic fiber along a given cross-section after liquid infusion of the ceramic matrix material.

In some embodiments, the particles of the particulate material have an average diameter of about 1 micron to about 20 microns, and in some embodiments, the plurality of particles comprises silicon carbide, boron carbide, aluminum oxide, silica, or combinations thereof. In certain embodiments, the plurality of ceramic fibers comprises silicon carbide, silicon nitride, silicon oxycarbides, silicon oxynitrides, aluminum oxide, silicon dioxide, aluminosilicates, carbon, or combinations thereof, and in some embodiments, the ceramic fibers are disposed in one or more plies wherein over about 50% of the ceramic fibers in at least one ply are disposed in the parallel direction. In certain embodiments, the particles of the particulate material are disposed between adjacent ceramic fibers such that substantially no ceramic fiber is touching another ceramic fiber along a given cross-section.

In certain embodiments, the ceramic matrix material comprises silicon carbide, silicon nitride, silicon oxycarbides, silicon oxynitrides, aluminum oxide, silicon dioxide, aluminosilicates, and combinations thereof and in some embodiments, the ceramic product is a gas turbine engine combustion liner, shroud, nozzle, or blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1A:
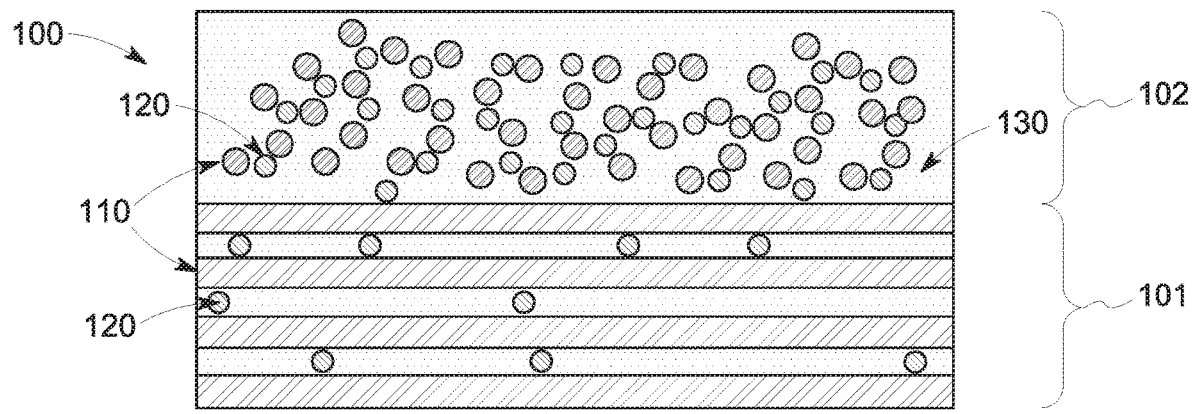
FIGS. 1a-1g are schematic views of an exemplary method of forming a ceramic product in accordance with one embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the "average particle diameter" refers to the equivalent spherical diameter of a particle size such that about 50 volume % of the particles have a volume that is greater than that of the average, and about 50 volume % of the particles have a volume that is less than that of the average.

As used herein, "substantially" refers to at least about 90% or more of the described group. For instance, as used herein, "substantially all" indicates that at least about 90% or more of the respective group have the applicable trait and "substantially no" or "substantially none" indicates that at least about 90% or more of the respective group do not have the applicable trait. As used herein, the "majority" refers to at least about 50% or more of the described group. For instance, as used herein, "the majority of" indicates that at least about 50% or more of the respective group have the applicable trait.

A ceramic product, particularly a product formed of a ceramic matrix composite, is generally provided herein, along with methods of forming such ceramic product. The method of production allows for an improved product and improved efficiency of production. The method allows for the use of near net shape manufacturing techniques to prepare ceramic matrix composites thereby providing an intermediate product with tighter tolerances, requiring less subsequent processing of such intermediate product to arrive at the final component. Previously, resin transfer molding and other near net shape matrix infusion methods were not suitable for use in manufacturing high performance CMCs as it was previously not possible to maintain proper fiber spacing in the tooling. For CMC laminates made from unidirectional plies, there has previously been an issue of maintaining the continuity of individual plies when laying up the part in the tooling, as there was no cross fiber to support the ply. The present method incorporates the use of a particulate material and fugitive binder during the liquid infusion process. The particulate material may provide the proper spacing of ceramic fibers in the ceramic composite thereby providing the ability to prepare near net shape CMCs and improve the yield and efficiency of production. The fugitive binder may prevent the particulate material from shifting or being removed from between the fibers while the plies are being laid into the tool, and in the case of a unidirectional ply may provide the proper integrity to keep the ply continuous in the directions orthogonal to the fiber axis. The tooling can be closed and precursor material for the ceramic matrix (the matrix system) may be added without disturbing the fiber spacing. The present method and materials can be used to prepare a variety of products using any suitable transfer molding process, such as vacuum infusion, resin infusion, resin transfer molding, and vacuum assisted resin transfer molding.

Without intending to be bound by theory, the utilization of a fugitive or temporary binder combined with particulate material allows the ceramic fiber plies to be placed into the tooling, the tooling to be closed, a ceramic matrix system to be introduced, and setting of the ceramic matrix system all while maintaining the desired fiber spacing. The temporary binder may be removed during processing and the matrix system backfilled into the ceramic fiber ply. In some embodiments, the temporary binder can be left with the prepreg ceramic composite and still allow backfilling with the matrix system after the tooling is closed. The addition of the matrix system after the fibers have been added to the tooling and the tooling closed prevents undue compression and movement of the fibers that may happen when the tooling is originally loaded with the fibers and matrix system together. When the tooling is originally loaded with the fibers and matrix system, either too much material is often present resulting in the components being pushed together and moved when closing the tooling. Too less of material may also be present. Either way, a defective product results. With the present fugitive binder and particulate system, the fibers can be loaded into the tooling with the desired spacing, and the spacing can be maintained when the tooling is closed and the matrix system is subsequently added to the composite. A near-net shape product can thereby be prepared.

Prepreg ceramic plies and ceramic composites may be prepared with a slurry that includes particulate material, with particles in the size range needed for fiber separation, and a temporary binder system. The plies may be laid up in the tooling, and the temporary binder may be removed via sublimation, evaporation, volatilization, or other suitable method. The particulate material remains ensuring fiber separation. Resin and other components of the matrix system may then be backfilled into the tooling. The part may then be cured or solidified such that the part can be removed from the tooling and other processes such as burn-out, pyrolysis, chemical vapor infiltration ("CVI"), polymer impregnation and pyrolysis ("PIP"), melt infiltration ("MI"), or a combination of such processes can be performed.

The particulate material combined with the temporary binder allow the proper fiber spacing to be maintained as the tooling is closed and as the matrix system is inserted into the tooling. The particles of the particulate material remain in the composite after setting the matrix system and may remain through further thermal processing of the composite or may be removed during further processing thereby providing the desired porosity of the composite for subsequent infiltration and densification. As the resulting product is produced with near net shaping, the product has tighter tolerances and thus requires less machining and further processing. The yield and efficiency are thereby improved.

The present method can be used to prepare a variety of components comprising ceramic matrix composites. For instance, the present method may be used to prepare components in the aviation industry. The present method may be used to prepare components for gas turbine engines, such as in high pressure compressors (HPC), fans, boosters, high pressure turbine (HPT), and low pressure turbines (LPT) of both airborne and land-based gas turbine engines. For instance, the present method may be used to prepare components for a turbofan engine or turbomachinery in general, including turbojet, turboprop and turboshaft gas turbine engines, including industrial and marine gas turbine engines and auxiliary power units. For instance, components such as combustion liners, shrouds, nozzles, blades, etc. may be prepared with the present method and materials.

CMC materials of particular interest to the invention are silicon-containing, or oxide containing matrix and reinforcing materials. Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, silicides and mixtures thereof. Examples include, but are not limited to, CMCs with a silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), yttrium aluminum garnet (YAG), aluminosilicates, and mixtures thereof. Aluminosilicates can include crystalline materials such as mullite ($3Al_2O_3 \cdot 2SiO_2$), as well as glassy aluminosilicates. Other ceramic composite materials that are not comprised of either silicon or oxygen may be used, including zirconium carbide, hafnium carbide, boron carbide, or other ceramic materials, alone or in combination with the materials noted above.

FIGS. 1a-1g are schematic views of an exemplary method and materials for forming a ceramic product in accordance with one embodiment of the present disclosure. In particular, FIGS. 1a-1g illustrate the cross-section of the ceramic composite at various stages in the method to prepare the ceramic product comprising a ceramic matrix composite. Various combinations of these stages may be performed and not all of the stages may be performed in the method. In the embodiment illustrated in FIGS. 1a-1g, the ceramic composite (e.g., a prepreg ceramic composite) comprises a cross-ply of two unidirectional plies (e.g., the fibers within each ply are generally disposed in a parallel direction relative to each other). The first ply 101 (labeled only in FIG. 1a, but present in FIGS. 1b-1g as well) is configured with the ceramic fibers 110 in a first direction and the second ply 102 is configured with the ceramic fibers 110 in a second direction. In the embodiment illustrated in FIGS. 1a-1g, the first direction is perpendicular to the second direction. In other embodiments, the first direction may be positioned in any orientation with respect to the second direction, such as about 0° to about 90°, such as about 45°. Multiple layers or "plies" may be used with each ply oriented in various directions (e.g., third, fourth, and fifth directions, etc.).

In the embodiment illustrated in FIGS. 1a-1g, at least one ceramic fiber 110 in each ply is disposed in a parallel direction relative to another ceramic fiber 110 within the respective ply. When substantially all of the ceramic fibers 110 within a single ply are disposed in a parallel direction relative to each other, the ply may be referred to as "unidirectional." In some embodiments, at least one ceramic fiber in each layer is disposed in a perpendicular direction relative to another ceramic fiber within the respective layer. When substantially all of the ceramic fibers 110 within a single ply are disposed in a parallel direction or a perpendicular direction such that the fibers are woven, the ply may be referred to as "cross-woven." While FIGS. 1a-1g show an embodiment with cross-plied unidirectional plies, the present method and materials can be used with a single unidirectional or cross-woven ply, or multiple unidirectional and/or cross-woven plies with alternating plies layered in a variety of orientations. Various configurations can be used without deviating from the intent of the present disclosure.

FIG. 1a illustrates the cross-section of a ceramic composite 100 comprising ceramic fibers 110, particulate material 120, and a binder 130. The particulate material 120 is positioned between the ceramic fibers 110 such that the fibers are properly spaced in the composite. The binder 130 fills in the remaining space of the composite.

The ceramic fibers 110 may comprise any suitable ceramic material. For instance, the ceramic fibers 110 may be any silicon-containing, non-silicon containing, oxide-containing, or non-oxide containing reinforcing material as discussed above and may comprise combinations of such suitable material. While in the embodiment illustrated in FIGS. 1a-1g the ceramic fibers 110 may generally be comprised of the same material, the ceramic fibers 110 of a single ply may vary in composition and/or the ceramic fibers 110 may vary in composition across multiple plies.

In certain embodiments, the fibers 110 may have at least one coating thereon. In particular embodiments, the at least one coating can have a layer selected from the group consisting of a nitride layer (e.g., a silicon nitride layer), a carbide layer (e.g., a silicon carbide layer), a boron layer (e.g., a boron nitride layer, including a silicon-doped boron nitride layer), a carbon layer, and combinations thereof. For example, the at least one coating can be deposited as a coating system selected from the group consisting of a nitride coating and a silicon carbide coating; a boron nitride, a carbide, and a silicon nitride coating system; a boron nitride, a silicon carbide, a carbide, and a silicon nitride coating system; a boron nitride, a carbon, a silicon nitride and a carbon coating system; and a boron nitride, a carbon, a silicon nitride, and a carbon coating system; and mixtures thereof. If present, the coating thickness can be about 0.1 microns to about 4.0 microns.

The ceramic fibers 110 are generally continuous in a single ply. That is, each ceramic fiber 110 is generally a continuous strand across the ply as opposed to fragments of fibrous material. The ceramic fibers 110 may have any suitable diameter or length to provide the desired ceramic product. In some embodiments, the ceramic fibers 110 may have a diameter of about 5 microns to about 20 microns, such as about 7 microns to about 14 microns. In some embodiments, the fibers may be considered monofilaments and have an average diameter of about 125 microns to about 175 microns, such as about 140 microns to about 160 microns. In such embodiments, the average diameter of the particulate material 120 would need to be larger than that used for the smaller diameter fibers.

The particulate material 120 may comprise any suitable ceramic particles such as silicon carbide, boron carbide, oxides, such as aluminum oxide or silica, or combinations thereof. The particulate material 120 may also comprise polymer particles such as polyamide, polypropylene, or combinations thereof. The binder 130 and particulate material 120 may be chosen such that the binder 130 can be removed from the ceramic composite 100 without removal of the particulate material 120. For instance, the binder 130 may be any organic compounds, such as waxes (e.g., natural or synthetic waxes such as paraffin), polymers (e.g., acrylics, epoxies), or combinations thereof. For instance, camphene, polyvinyl butyral (PVB), such as BUTVAR® B-79, or combinations thereof may be used. The binder may also be an inorganic material, such as sol-gels (e.g., tetraethylorthosilicate, aluminum chlorohydrate), polysiloxanes (e.g., silicones), or combinations thereof. While the binder may be referred to as a "fugitive" or "temporary" binder, the binder may be removed as explained below to various degrees (such as not removed at all) to provide the desired resulting ceramic product.

The particulate material 120 may comprise particles with a diameter suitable to provide the spacing desired in the composite. For instance, the particulate material 120 may comprise particles with an average diameter of about 1 to about 20 microns, such as about 2 to about 18 microns, or about 3 to about 15 microns. The particle size is sufficient to provide the desired spacing between fibers in the resulting ceramic product and may provide the desired porosity in the composite after thermal treatment. The ceramic composite 100 may be configured such that the particulate material 120 provides the desired spacing between ceramic fibers 110 in the composite. For instance, the particles may be disposed between adjacent fibers such that the adjacent fibers are physically touching opposite sides of a single particle. The majority of the ceramic fibers may not touch another ceramic fiber at a given cross section. In certain embodiments, substantially all of the ceramic fibers at a given cross section do not touch another ceramic fiber along that cross section. Such positioning of the particles may be done across substantially the entire ply. The particle size may depend on the diameter of the fiber, the coating thickness, and the desired fiber volume fraction.

The ceramic composite 100 may be prepared in a variety of ways. In some embodiments, the ceramic fibers 110 may be introduced into a slurry comprising the binder 130, particulate material 120, and any other additional desired components to form the plies 101 and 102. For instance, in some embodiments, it may be beneficial to include a carrier or solvent, surfactants, dispersing agents, and/or other components in the slurry. At this stage, the slurry may not include the matrix system or may not include all of the matrix system intended to be added. At least some of the matrix system will be added once the composite is in the tooling and the tooling is closed.

In one embodiment, once the slurry is incorporated with the ceramic fibers 110, the fiber may be wound on a drum roll to form a tape and then cut into plies 101 and 102. One or more plies may be layered with the plies having various relative orientations. For instance, one or more plies may be cross-plied or layered directly over each other such that the fibers are oriented in the same direction. The configuration of the fibers in the tapes and the configuration of the plies may be modified depending on the desired ceramic product and desired mechanical properties of the ceramic product. In other embodiments, the slurry can be introduced to the fiber via tape casting, screen printing, or any other suitable method. The ceramic fibers 110 within the composite may be unidirectional or may be cross-woven. The slurry of binder 130 and particulate material 120 and method of introducing the slurry to the ceramic fibers 110 may be modified depending on the orientation of the ceramic fibers 110.

Figure 1B:
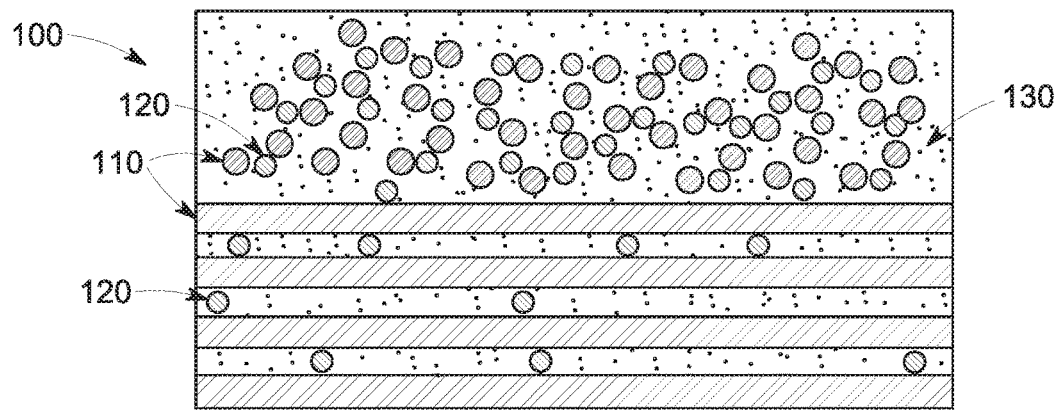
Figure 1C:
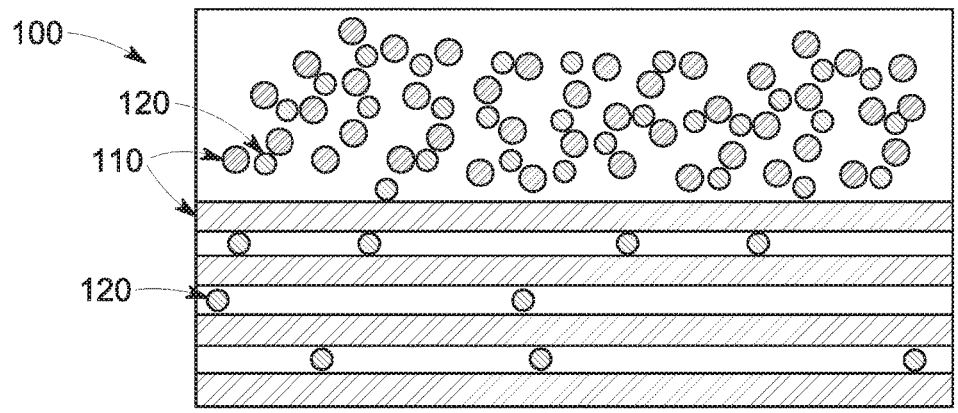

FIG. 1b illustrates a cross-section of a ceramic composite 100 after partial removal of the binder 130. FIG. 1c illustrates a cross-section of a ceramic composite 100 after substantially complete removal of the binder 130. The binder 130 may be removed in whole or in part by any suitable process such as sublimation, evaporation, volatilization, the like, or combinations thereof. For instance, in some embodiments, the binder 130 may be used along with a solvent. During processing, the solvent may be removed, such as by evaporation, leaving a portion of the binder 130 in the ceramic composite 100. In some embodiments, the binder 130 may be present in such low concentrations in the ceramic composite 100 that processing to remove the binder 130 or reduce the amount of binder 130 present may not be needed. If present, the binder 130 is generally included in an amount such that the matrix system can still be filled in the composite between ceramic fibers 110.

Figure 1D:
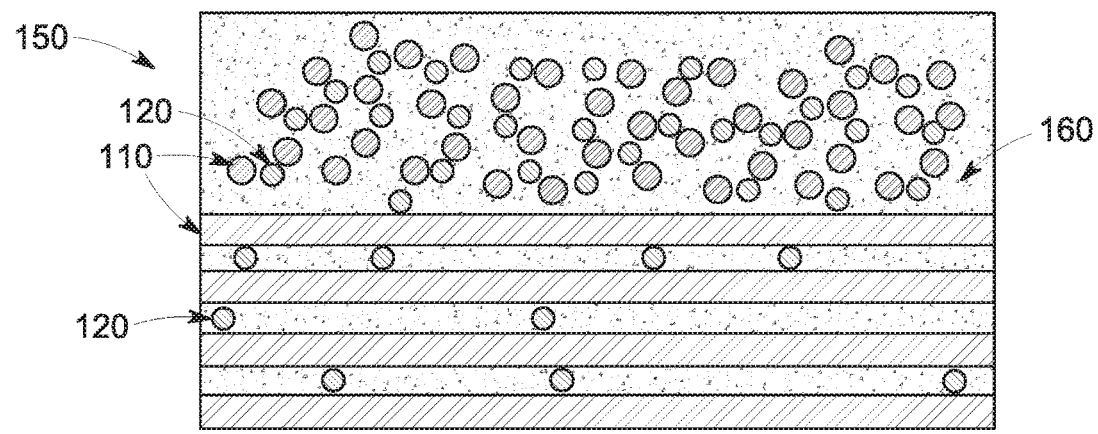

FIG. 1d illustrates a cross-section of a matrix-filled ceramic composite 150. After placing the ceramic composite 100 in the tooling with the particulate material 120 positioned between the ceramic fibers 110 as desired, and removal of the binder 130 (if desired), the matrix system 160 may be introduced into the tooling such that the matrix system 160 fills any remaining voids or spaces in the composite. For instance, it may be desired to apply a vacuum on the tooling and then introduce the matrix system 160 into the tooling such that the matrix system 160 fills any remaining voids or spaces while not washing away the particulate material 120 disposed between the ceramic fibers 110.

The matrix system 160 may comprise any suitable material desired in the ceramic composite. For instance, the matrix system 160 may comprise a resin that upon heating forms the desired ceramic material. For instance, the resin may be polysilazanes, polycarbosilanes, phenolics, epoxies, or combinations thereof. In some embodiments, the matrix system 160 may comprise additional components such as particulates and other additives. The particulates introduced in the matrix system 160 are typically not large enough to provide the desired spacing between the ceramic fibers 110.

Figure 1E:
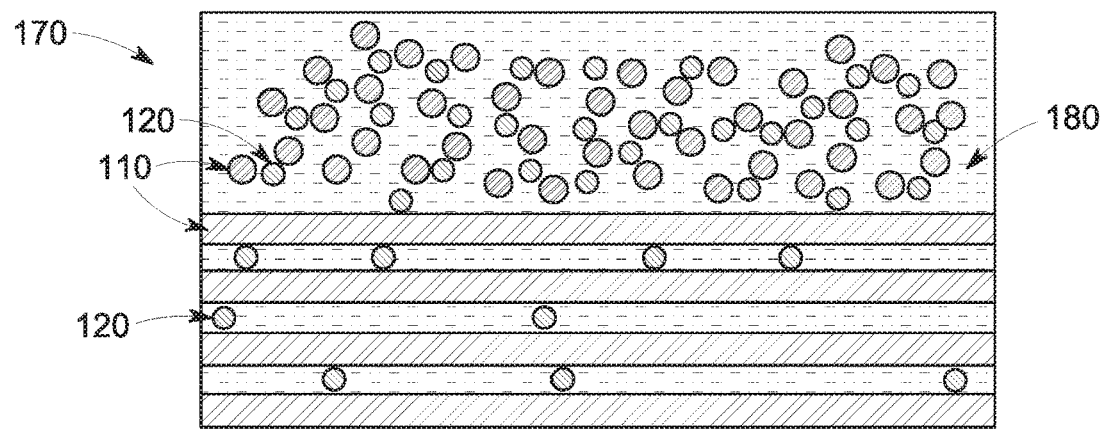
Figure 1F:
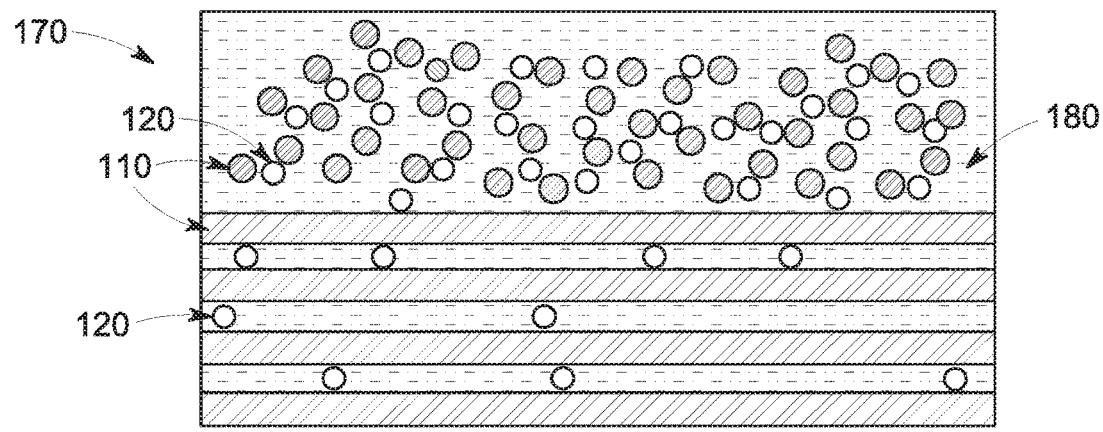

The matrix-filled ceramic composite 150 may be treated, such as by treatment with a catalyst or thermal treatment, such that the ceramic composite is set forming a "set ceramic composite" 170 and can then be removed from the tooling. The "set ceramic composite" has an increased rigidity compared to the matrix-filled ceramic composite 150 such that it can be removed from the tooling and may be further processed. For instance, the matrix-filled ceramic composite 150 may cure or be cured such that the resin hardens and forms a set ceramic composite 170. In some embodiments, curing may not be needed prior to removal, and the set ceramic composite 170 may be removed from the tooling without curing. FIG. 1e illustrates the set ceramic composite 170 resulting from such processing. The set ceramic composite 170 includes the ceramic fibers 110, particulate material 120, and the set matrix system 180.

The set ceramic composite 170 may then be removed from the tooling. The set ceramic composite 170 may be referred to as a "green structure" in that additional processing may be desired before the final product is obtained.

If desired, the particulate material 120 may be removed from the set ceramic composite 170 before or after removal from the tooling. FIG. if illustrates the cross-section of a set ceramic composite 170 with the particulate material 120 removed from the composite to create various pores in the composite. The particulate material 120 may be removed in whole or in part and may be removed by any suitable process to allow for the formation of pores in the composite.

Figure 1G:
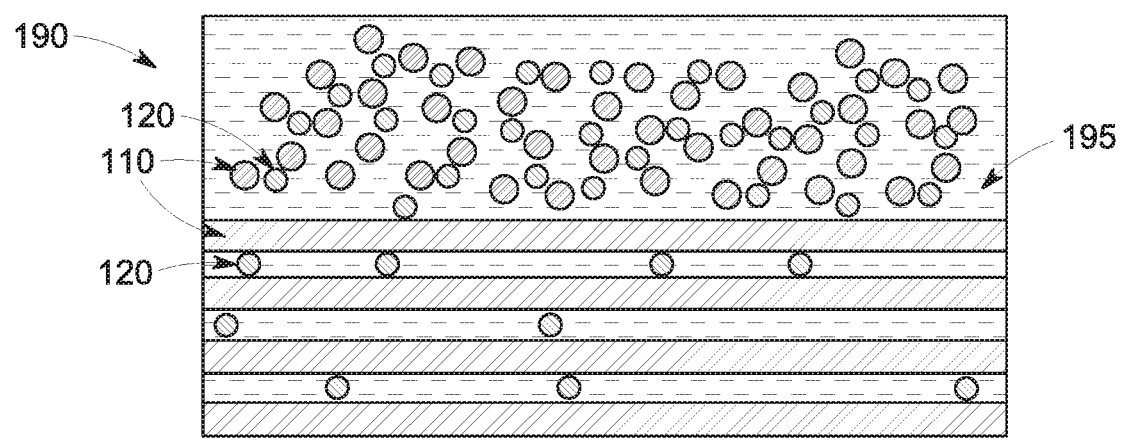

FIG. 1g illustrates the cross-section of a ceramic product 190 obtained from the present method in certain embodiments. The set ceramic composite 170 may be treated by processing such as burn-out, pyrolysis, chemical vapor infiltration ("CVI"), polymer impregnation and pyrolysis ("PIP"), melt infiltration ("MI") or combinations thereof. The particulate material 120 beneficially provides the desired porosity or microstructure for application of an infiltrant in preparation of the final ceramic product 190. The set ceramic composite 170 may be machined as needed to obtain the desired ceramic product 190.

FIG. 1g illustrates the ceramic product 190 resulting from such processing. As shown in FIG. 1g, the ceramic product 190 includes the ceramic fibers 110 and particulate material 120. The ceramic product 190 also includes densified ceramic matrix material 195. As noted above, the particulate material 120 may be removed in whole or in part prior to further processing such as burn-out, pyrolysis, chemical vapor infiltration ("CVI"), polymer impregnation and pyrolysis ("PIP"), melt infiltration ("MI") or combinations thereof. In such embodiments, the cross-section of the ceramic product 190 would have less particulate material 120, if any, compared to the cross-section illustrated in FIG. 1g.

The ceramic product 190 may be any product where it is desired to comprise a ceramic matrix composite. For instance, ceramic matrix composites are particularly beneficial in the aviation industry in gas turbine engines where it is desired to have components that can withstand high temperature environments and are light weight. For instance, the present method may be used to prepare combustion liners, shrouds, nozzles, blades, and other similar components. The present method allows these components to be made with near net shape thereby reducing subsequent processing and resulting in higher yields and better efficiencies in production.

Figure 2:
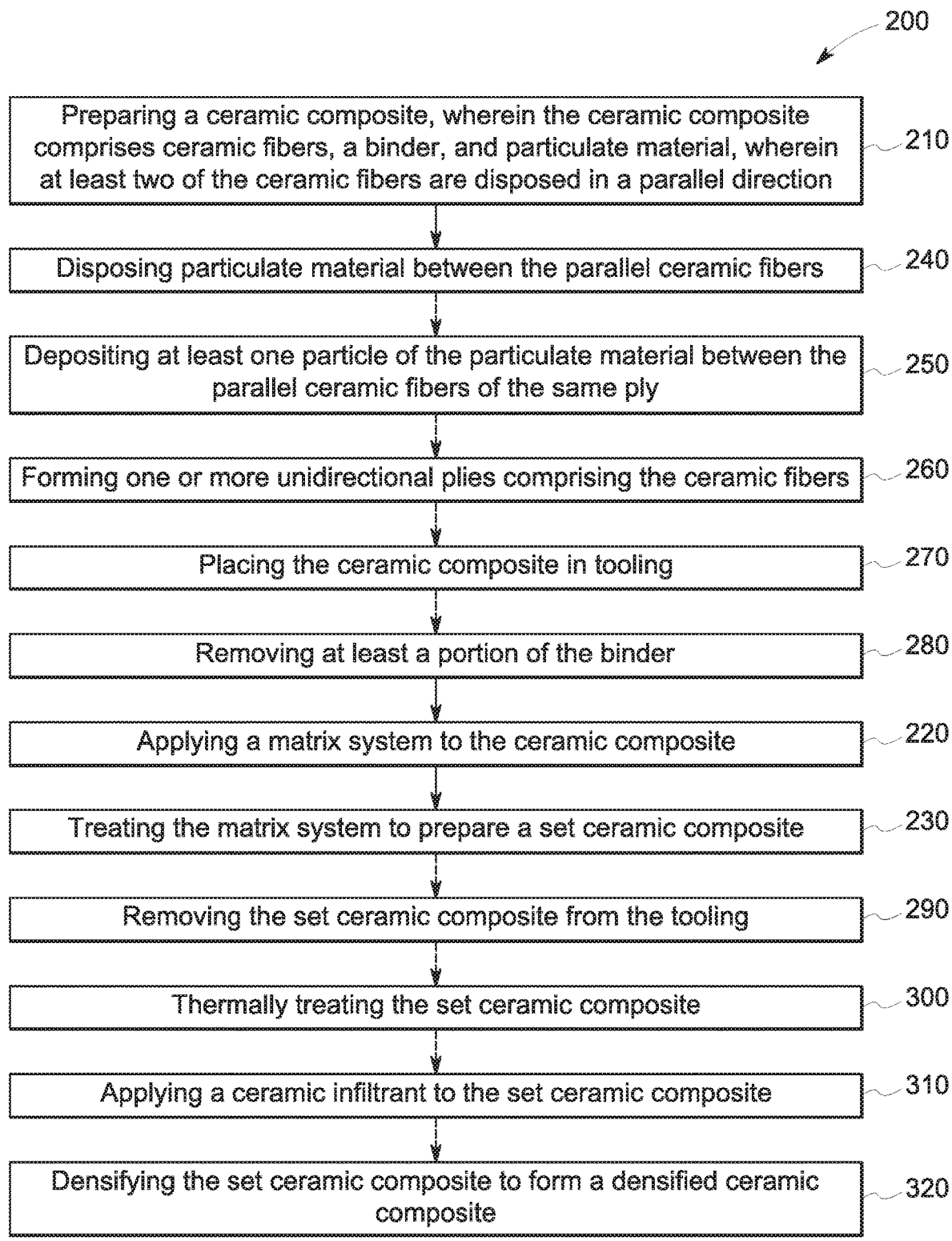
FIG. 2 is a flowchart of an exemplary method of forming a ceramic product in accordance with one embodiment of the present disclosure.

FIG. 2 is an exemplary method of forming a ceramic product in accordance with one embodiment of the present disclosure. In the embodiment illustrated in FIG. 2, the method 200 includes preparing a ceramic composite 210, wherein the ceramic composite comprises ceramic fibers, a binder, and particulate material, wherein at least two of the ceramic fibers are disposed in a parallel direction. In some embodiments, preparing the ceramic composite 210 may comprise disposing the particulate material between parallel ceramic fibers 240 to provide the desired spacing between fibers. This may include depositing at least one particle of the particulate material between the parallel ceramic fibers of the same ply 250. In some embodiments, the method 200 may also include forming one or more unidirectional plies comprising the ceramic fibers 260, placing the ceramic composite in tooling 270, and removing at least a portion of the binder 280. The method 200 further comprises applying a matrix system to the ceramic composite 220 and treating the matrix system to prepare a set ceramic composite 230. In some embodiments, the method 200 may also comprise removing the set ceramic composite from any tooling 290, thermally treating the set ceramic composite 300, applying an infiltrant to the set ceramic composite 310, and densifying the set ceramic composite to form a densified ceramic composite 320. The infiltrant may be disposed in the pore network of the set ceramic matrix composite to increase the density of the final product. The infiltrant can be any of various materials used in ceramic matrix composite processing. Examples of suitable infiltrants include molten material, such as silicon or silicon alloy as in melt infiltration (MI) processes; vapor, such as silicon carbide precursors as in chemical vapor infiltration (CVI) processes; or liquid resin, as in polymer impregnation and pyrolysis (PIP).

The set ceramic composite may be subsequently processed as discussed above to prepare a ceramic product. Various combinations of these method steps may be used without deviating from the intent of the present disclosure.

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A liquid infusion molded ceramic product, comprising:
    a plurality of ceramic fibers, wherein at least two ceramic fibers of the plurality of ceramic fibers are adjacent to one another and disposed in a parallel direction relative to one another;
    a particulate material comprising a plurality of particles, wherein the plurality of particles has an average diameter of about 1 micrometer to about 20 micrometers, wherein at least two particles of the plurality of particles are disposed along respective lengths of the at least two ceramic fibers and interposed between respective exteriors of the at least two ceramic fibers to space apart a majority of each of the at least two ceramic fibers from one another; and a ceramic matrix material disposed between the plurality of ceramic fibers, wherein a majority of the plurality of ceramic fibers are not touching another ceramic fiber along a given cross-section of the liquid infusion molded ceramic product after liquid infusion of the ceramic matrix material.

2. The liquid infusion molded ceramic product according to claim 1, wherein the plurality of particles comprises silicon carbide, boron carbide, aluminum oxide, silica, or combinations thereof.

3. The liquid infusion molded ceramic product according to claim 1, wherein the plurality of ceramic fibers comprises silicon carbide, silicon nitride, silicon oxycarbides, silicon oxynitrides, aluminum oxide, silicon dioxide, aluminosilicates, carbon, or combinations thereof.

4. The liquid infusion molded ceramic product according to claim 1, wherein the plurality of ceramic fibers is disposed in one or more plies, wherein at least about 50% of the plurality of ceramic fibers in at least one ply of the one or more plies are disposed in the parallel direction.

5. The liquid infusion molded ceramic product according to claim 1, wherein the plurality of particles is disposed between adjacent ceramic fibers of the plurality of ceramic fibers such that substantially no ceramic fiber is touching another ceramic fiber along the given cross-section of the liquid infusion molded ceramic product.

6. The liquid infusion molded ceramic product according to claim 1, wherein the ceramic matrix material comprises silicon carbide, silicon nitride, silicon oxycarbides, silicon oxynitrides, aluminum oxide, silicon dioxide, aluminosilicates, or combinations thereof.

7. The liquid infusion molded ceramic product according to claim 1, wherein the liquid infusion molded ceramic product is a gas turbine engine combustion liner, a shroud, a nozzle, or a blade.

8. The liquid infusion molded ceramic product according to claim 1, wherein the plurality of ceramic fibers has an average diameter of about 5 micrometers to about 20 micrometers.

9. The liquid infusion molded ceramic product according to claim 1, wherein each of the plurality of ceramic fibers comprises a respective coating having a coating thickness of about 0.1 micrometers to about 4 micrometers.

10. A ceramic product prepared by a method comprising the steps of:
preparing a ceramic composite, wherein the ceramic composite comprises ceramic fibers and a particulate material including a plurality of particles, wherein at least two ceramic fibers of the ceramic fibers are adjacent to one another and disposed in a parallel direction relative to one another, and wherein the plurality of particles has an average diameter of about 1 micrometer to about 20 micrometers;
disposing at least two particles of the plurality of particles along respective lengths of the at least two ceramic fibers, wherein the at least two particles are interposed between respective exteriors of the at least two ceramic fibers to space apart a majority of each of the at least two ceramic fibers from one another;
placing the ceramic composite in tooling;
applying a matrix system to the ceramic composite;
treating the matrix system to prepare a set ceramic composite; and
removing the set ceramic composite from the tooling.

11. The ceramic product of claim 10, wherein applying the matrix system to the ceramic composite comprises:
closing the tooling prior to applying the matrix system to the ceramic composite; and
applying the matrix system to the ceramic composite while the tooling is closed.

12. The ceramic product of claim 10, wherein preparing the ceramic composite comprises applying a binder to the particulate material.

13. The ceramic product of claim 12, wherein applying the matrix system to the ceramic composite comprises:
removing at least a portion of the binder prior to applying the matrix system to the ceramic composite; and
subsequent to removing at least the portion of the binder, applying the matrix system to the ceramic composite to backfill the ceramic composite.

14. A method of forming a liquid infusion molded ceramic matrix composite, comprising:
preparing a ceramic composite, wherein the ceramic composite comprises ceramic fibers and a particulate material including a plurality of particles, wherein at least two ceramic fibers of the ceramic fibers are adjacent one another and disposed in a parallel direction relative to one another, and wherein the plurality of particles has an average diameter of about 1 micrometer to about 20 micrometers;
disposing at least two particles of the plurality of particles along respective lengths of the at least two ceramic fibers, wherein the at least two particles are interposed between respective exteriors of the at least two ceramic fibers to space apart a majority of each of the at least two ceramic fibers from one another;
placing the ceramic composite in tooling;
applying a matrix system to the ceramic composite;
treating the matrix system to prepare a set ceramic composite; and
removing the set ceramic composite from the tooling.

15. The method according to claim 14, wherein the average diameter of the plurality of particles is between about 3 micrometers to about 15 micrometers.

16. The method according to claim 14, wherein preparing the ceramic composite comprises forming one or more unidirectional plies comprising the ceramic fibers.

17. The method according to claim 14, wherein preparing the ceramic composite comprises applying a binder to the particulate material, and wherein applying the matrix system to the ceramic composite comprises removing at least a portion of the binder prior to applying the matrix system to the ceramic composite.

18. The method according to claim 17, wherein removing at least the portion of the binder comprises sublimation, evaporation, volatilization, or combinations thereof, of the portion of the binder.

19. The method according to claim 14, further comprising:
thermally treating the set ceramic composite;
applying an infiltrant to the set ceramic composite; and
densifying the set ceramic composite to form a densired ceramic composite.

20. The method according to claim 19, wherein applying the infiltrant and densifying the set ceramic composite comprises using chemical vapor infiltration (CVI), melt infiltration (MIU), polymer impregnation and pyrolysis (PIP), or a combination thereof.

* * * * *